(12) United States Patent
Liang et al.

(10) Patent No.: US 10,397,866 B2
(45) Date of Patent: Aug. 27, 2019

(54) METHOD AND DEVICE FOR COMPUTING ACTIVATION TIME

(71) Applicant: China Academy of Telecommunications Technology, Beijing (CN)

(72) Inventors: Jing Liang, Beijing (CN); Dong Chen, Beijing (CN); Yumin Wu, Beijing (CN); Hang Ruan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/781,883

(22) PCT Filed: Jan. 21, 2014

(86) PCT No.: PCT/CN2014/070946
§ 371 (c)(1),
(2) Date: Oct. 1, 2015

(87) PCT Pub. No.: WO2014/161376
PCT Pub. Date: Oct. 9, 2014

(65) Prior Publication Data
US 2016/0112948 A1    Apr. 21, 2016

(30) Foreign Application Priority Data
Apr. 2, 2013    (CN) .......................... 2013 1 0112462

(51) Int. Cl.
*H04W 28/02* (2009.01)
*H04W 48/12* (2009.01)
(Continued)

(52) U.S. Cl.
CPC ....... *H04W 52/0216* (2013.01); *H04W 24/02* (2013.01); *H04W 28/0221* (2013.01);
(Continued)

(58) Field of Classification Search
CPC .... H04W 76/048; H04W 24/00; H04L 1/1854
(Continued)

(56) References Cited

U.S. PATENT DOCUMENTS

| | | | | |
|---|---|---|---|---|
| 2005/0282528 A1* | 12/2005 | Charpentier | .......... | H04L 12/189 455/414.2 |
| 2005/0288040 A1* | 12/2005 | Charpentier | .......... | H04W 68/02 455/458 |

(Continued)

FOREIGN PATENT DOCUMENTS

| | | |
|---|---|---|
| CN | 101940035 A | 1/2011 |
| CN | 102300297 A | 12/2011 |

(Continued)

OTHER PUBLICATIONS

International Search Report of PCT/CN2014/070946 dated Apr. 23, 2014, 4 pages.

(Continued)

*Primary Examiner* — Asad M Nawaz
*Assistant Examiner* — Jason A Harley
(74) *Attorney, Agent, or Firm* — Kilpatrick Townsend & Stockton LLP

(57) ABSTRACT

The present invention relates to DRX technology and disclosed are a method and device for computing an activation time, which are used for solving the problem that a UE cannot enter an active state at an accurate time when using an extended DRX cycle. The method is: a network side notifying a UE of a serial number of a current SFN cycle in an extended DRX cycle, and the UE computing an activation time of the UE by combining the length of a preset extended DRX cycle in accordance with the serial number. In this way, when the extended DRX cycle is greater than the SFN cycle, the UE can still compute a correct paging time and/or a time of receiving service data, thereby entering the active (Continued)

state at an accurate time, effectively avoiding the situation where paging messages or service data are lost due to computation errors of the UE, then guaranteeing the service QoS of the UE and improving the service performance of the system.

6 Claims, 6 Drawing Sheets

(51) Int. Cl.
    *H04W 52/02*     (2009.01)
    *H04W 76/28*     (2018.01)
    *H04W 24/02*     (2009.01)
    *H04W 68/00*     (2009.01)

(52) U.S. Cl.
    CPC ... *H04W 52/0212* (2013.01); *H04W 52/0219* (2013.01); *H04W 68/00* (2013.01); *H04W 76/28* (2018.02); *Y02D 70/00* (2018.01); *Y02D 70/1242* (2018.01); *Y02D 70/1262* (2018.01); *Y02D 70/21* (2018.01); *Y02D 70/24* (2018.01)

(58) Field of Classification Search
    USPC .......................................... 340/7.2; 455/458
    See application file for complete search history.

(56) References Cited

U.S. PATENT DOCUMENTS

| | | | | |
|---|---|---|---|---|
| 2011/0076957 | A1* | 3/2011 | Kunz | H04W 48/10 455/67.11 |
| 2011/0098761 | A1* | 4/2011 | Wittenberger | A61B 5/0488 607/1 |
| 2012/0300685 | A1 | 11/2012 | Kim et al. | |
| 2013/0044659 | A1 | 2/2013 | Jokimies et al. | |
| 2013/0109347 | A1* | 5/2013 | Feng | H04L 63/062 455/411 |
| 2013/0301501 | A1* | 11/2013 | Olvera-Hernandez | H04W 52/0216 370/311 |
| 2015/0063095 | A1* | 3/2015 | Deng | H04W 76/18 370/221 |

FOREIGN PATENT DOCUMENTS

| | | |
|---|---|---|
| CN | 102421148 A | 4/2012 |
| CN | 104303586 A | 1/2015 |
| EP | 2369883 A1 | 9/2011 |
| KR | 20120122791 A | 11/2012 |

OTHER PUBLICATIONS

The Extended European Search Report dated Mar. 2, 2016 in the EP counterpart application (14780219.3).
3GPP TS 36.304 V11.3.0, 3rd Generation Partnership Project; Technical Specification Group Radio Access Network; Evolved Universal Terrestrial Radio Access (E-UTRA); User Equipment (UE) procedures in idle mode (Release 11), Mar. 2013, 34 pages.
Nokia Siemens Networks, "Extending the range of the $2^{nd}$ DRX cycle length", 3 GGP TSG-WG2 Meeting #81, R2-130736, Jan. 28-Feb. 1, 2013, 6 pages.

* cited by examiner

METHOD AND DEVICE FOR COMPUTING ACTIVATION TIME

This application is a US National Stage of International Application No. PCT/CN2014/070946, filed on Jan. 21, 2014, designating the United States, and claiming the benefit of Chinese Patent Application No. 201310112462.8, filed with the State Intellectual Property Office of People's Republic of China on Apr. 2, 2013 and entitled "Method and device for calculating active time", which is hereby incorporated by reference in its entirety.

FIELD

The present invention relates to the field of Discontinuous Reception (DRX) and particularly to a method and device for calculating an active time.

BACKGROUND

Machine-Type Communication (MTC), which is a new communication idea, is intended to integrate a number of different types of communication technologies together, e.g., machine-to-machine communication, machine controlled communication, human-to-machine interactive communication, mobile Internet communication, etc., to thereby develop social production and life styles. As expected, human-to-human communication services will account for only one third of the terminal markets in the future, whereas a larger amount of communication will emerge as MTC communication services. Sometimes MTC communication is also referred to as Machine-to-Machine (M2M) communication or the Internet of Things.

An existing mobile communication network is designed, for example, the capacity of the network is determined, etc., for human-to-human communication. If the mobile communication network is intended to support MTC communication, then the mechanism of the mobile communication system needs to be optimized according to the characteristics of MTC communication, so that MTC communication can be better performed with a minor or no influence upon traditional human-to-human communication.

An important issue of power saving needs to be considered in an MTC communication scenario. In some scenarios, the lifetime of an MTC device is determined directly by the lifetime of a battery, for example, an MTC device for tracking an animal or an MTC device for hydrologic supervision, for both of which it is nearly impossible to replace their batteries, so the MTC device is required to have an extremely low power consumption.

From the perspective of the radio network side, there are two states, i.e., the Radio Resource Control (RRC)_connected state and the RRC_idle state, of a UE in a Long Term Evolution (LTE) system. There are five states, i.e., a state where a dedicated channel is established (cell_dch), a state where a forward access channel is established (cell_fach), a state where a cell is updated periodically (cell_pch), a state where a registration area is updated periodically (ura_pch), and an idle state, of a UE in a Universal Mobile Telecommunication System (UMTS), where cell_dch, cell_fach and cell_pch and ura_pch states belong to the RRC_connected state, and only the UE in the RRC_connected state can transmit uplink data. Once the transmission of data by the UE is completed, the network releases the RRC connection of the UE in an RRC Connection Release message upon monitoring that the UE has no data transmitted for a long period of time, so that the UE enters the RRC_idle state.

The UE in the idle state primarily operates to monitor paging by the network side. In order to save power, the UE generally monitors paging in a DRX mode in which the UE receives in only one sub-frame (10 ms) in each paging cycle but does not receive for the remaining period of time in the paging cycle, particularly as illustrated in FIG. 1.

In the UMTS system, the length of a DRX cycle configured at the network side at present is at most $2^9$ radio frames (i.e. 5120 ms), that is, for DRX in the UMTS system, the UE enables a receiver at most once every 5120 ms to receive a paging instruction message, and possibly a paging message, of the network side, but disables the receiver for the remaining period of time for the purpose of saving power. The longest DRX cycle configured at the network side at present in the LTE system is 2560 ms.

There are possibly two DRX lengths configured for the UE in both the UMTS system and the LTE system. One of the DRX lengths is configured by a Radio Network Controller (RNC)/evolved Node B (eNB) in a System Information Block (SIB) message and can be referred to a default length, which is applicable to all of UEs camping on in the cell; and the other DRX length is negotiated about by a Core Network (CN) entity and the UE in a Non-Access Stratum (NAS) procedure and can be referred to a UE specific DRX, which is only applicable to a single UE. The latter DRX is unknown to the RNC/eNB in a negotiation procedure. The UE monitors a paging message at the shorter one of the two DRX cycles available.

For a paging procedure, the CN entity initiates the paging, and a paging message is firstly transmitted to the RNC (in the UMTS)/eNB (in the LTE system), particularly as illustrated in FIG. 2 and FIG. 3. As illustrated in FIG. 2 and FIG. 3, the paging message carries UE specific DRX configuration. In the UTSM system, the RNC will transmit the paging message via an air interface (i.e., an Iu interface) using a DRX parameter configured in the paging message. In the LTE system, the eNB will compare the DRX parameter configured in the paging message with a DRX parameter configured in a system message and transmit the paging message in the shorter one of the DRX cycles.

In the LTE system, in order to save energy consumption of the UE and to prolong a service period of time of the battery in the UE, the DRX operating mode in the connected state (i.e., the RRC_connected state) is introduced to the LTE to allow the UE to monitor a control channel discontinuously. The DRX operating mode in the connected state includes an active time period and an inactive time period, where the UE needs to monitor a Physical Downlink Control Channel (PDCCH), to receive and send data, and to transmit signaling, in the active time period; and the UE disables a radio frequency unit in the inactive time period to reduce an unnecessary power overhead. The DRX cycle is temporally divided to be in two states, particularly as illustrated in FIG. 4.

Since various services of a user are activated in different levels, for the activation levels for different services, different DRX cycles need to be configured, so long and short cycles are designed for the DRX operating mode in the connected state, where the lengths of the long DRX cycle and the short DRX cycle are configured according to the activation characteristics of the different services of the UE. The length of the long DRX cycle is configured in an RRC message and ranges from 10 to 2560 sub-frames; and the length of the short DRX cycle is configured in an RRC message and ranges from 2 to 640 sub-frames.

The starting position of DRX is the starting point of the "on" state in the DRX cycle, and when the UE will be awoken to monitor a control channel is determined by the starting point of DRX. The UE can be notified explicitly of the offset of a DRX starting point via RRC signaling at the starting point of DRX.

In the UMTS system, the DRX mechanism is introduced to both the cell_fach state and the cell_pch state, and the long and short cycles are applied to both of the states; and the length of the long DRX cycle in both of the states is at most 5120 ms, and the starting point of the "on" state in the DRX cycle is determined similarly to the LTE system.

In the system, the length of the cycle at which a System Frame Number (SFN) is updated (also referred to as an SFN cycle) is 10.24 s, and there are 1024 radio frames, numbered from 0 to 1023, in an SFN cycle, each of which has a length of 10 ms. In the UMTS system, the length of the SFN cycle is 40.96 s including 4096 radio frames, numbered from 0 to 4095, each of which has a length of 10 ms.

For some MTC terminal, a longer DRX cycle needs to be applied for higher power-saving performance; and correspondingly the DRX cycle specified in the existing protocol (e.g., at most 2.56 seconds in the LTE system, and 5.12 seconds in the UMTS) needs to be extended to an order of a minute and even an hour. However if the DRX cycle is extended, then if the extended DRX cycle is longer than the SFN cycle (10.24 s), then the UE can not calculate an accurate active time in the existing approaches because the active time calculated as in the existing approaches lies in the same SFN cycle so that the UE can not be awoken timely at the corresponding active time to receive a message and data transmitted by the network side, thus resulting in a loss of information and consequently degrading seriously the Quality of Service (QoS) of the UE.

SUMMARY

Embodiments of the invention provide a method and device for calculating an active time so as to address such a problem that a UE to which an extended DRX cycle is applied can not be activated at an accurate time.

Particular technical solutions according to the embodiments of the invention are as follows:

A method for notifying of an active time includes:

determining, by the network side, the sequence number of a current SFN cycle in an extended DRX cycle; and notifying, by the network side, a User Equipment (UE) of the sequence number of the current SFN cycle in the extended DRX cycle, so that the UE calculates an active time of the UE in the current SFN cycle according to the sequence number in combination with a preset length of the extended DRX cycle.

A method for calculating an active time includes:

receiving, by a User Equipment (UE), the sequence number of a current SFN cycle in an extended DRX cycle, sent by the network side; and calculating, by the UE, an active time of the present device according to the sequence number of the current SFN cycle in the extended DRX cycle in combination with a preset length of the extended DRX cycle.

A device for notifying of an active time includes:

a determining unit configured to determine the sequence number of a current SFN cycle in an extended DRX cycle; and a communicating unit configured to notify a User Equipment (UE) of the sequence number of the current SFN cycle in the extended DRX cycle, so that the UE calculates an active time of the UE in the current SFN cycle according to the sequence number in combination with a preset length of the extended DRX cycle.

A device for calculating an active time includes:

a communicating unit configured to receive the sequence number of a current SFN cycle in an extended DRX cycle, sent by the network side; and a controlling unit configured to calculate an active time of the present device according to the sequence number of the current SFN cycle in the extended DRX cycle in combination with a preset length of the extended DRX cycle.

In the embodiments of the invention, the network side notifies the UE of the sequence number of the current SFN cycle in the extended DRX cycle, and the UE calculates an active time of the present UE according to the sequence number in combination with the preset length of the extended DRX cycle, so that even if the extended DRX cycle is longer than the SFN cycle, the UE can calculate a correct paging time and/or a correct time to receive service data, to thereby avoid effectively the UE from losing a paging message or service data due to an error in calculation, so that the UE can be activated at the accurate time, thus guaranteeing the Quality of Service (QoS) of the UE and improving the service performance of the system.

DETAILED DESCRIPTION OF THE EMBODIMENTS

If an extended DRX cycle is applied to a UE, then in order to enable the UE to be activated at an accurate time, embodiments of the invention propose a new method for calculating an active time, so that the UE in either the idle state or the connected state can calculate a correct active time in the case that the extended DRX cycle in use is longer than an SFN cycle.

Preferred embodiments of the invention will be described below in details with reference to the drawings.

Figure 1:
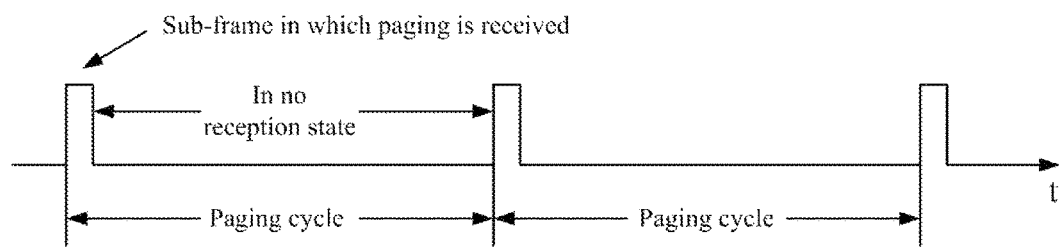
FIG. 1 illustrates a schematic diagram of monitoring paging by the UE in the DRX mode in the paging cycle in the prior art.
Figure 2:
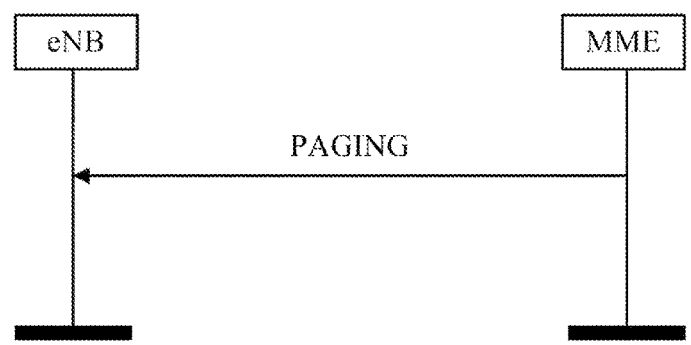
FIG. 2 illustrates a schematic diagram of the paging message via the S1 interface in the LTE system in the prior art.
Figure 3:
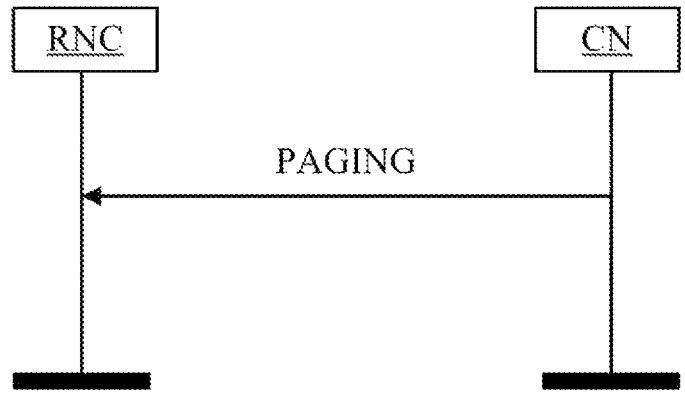
FIG. 3 illustrates a schematic diagram of the paging message via the Iu interface in the UMTS system in the prior art.
Figure 4:
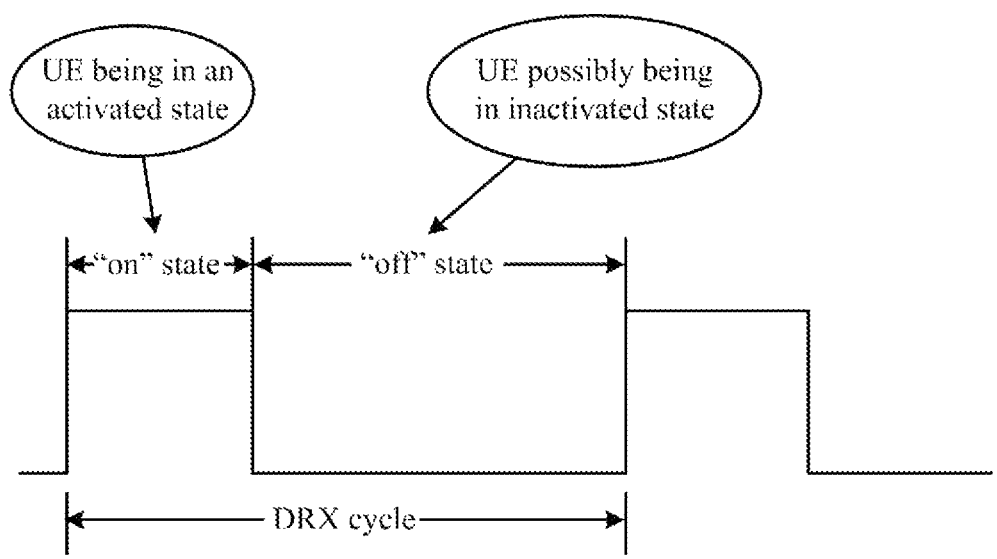
FIG. 4 illustrates a schematic diagram of the DRX cycle in the connected state in the prior art.
Figure 5:
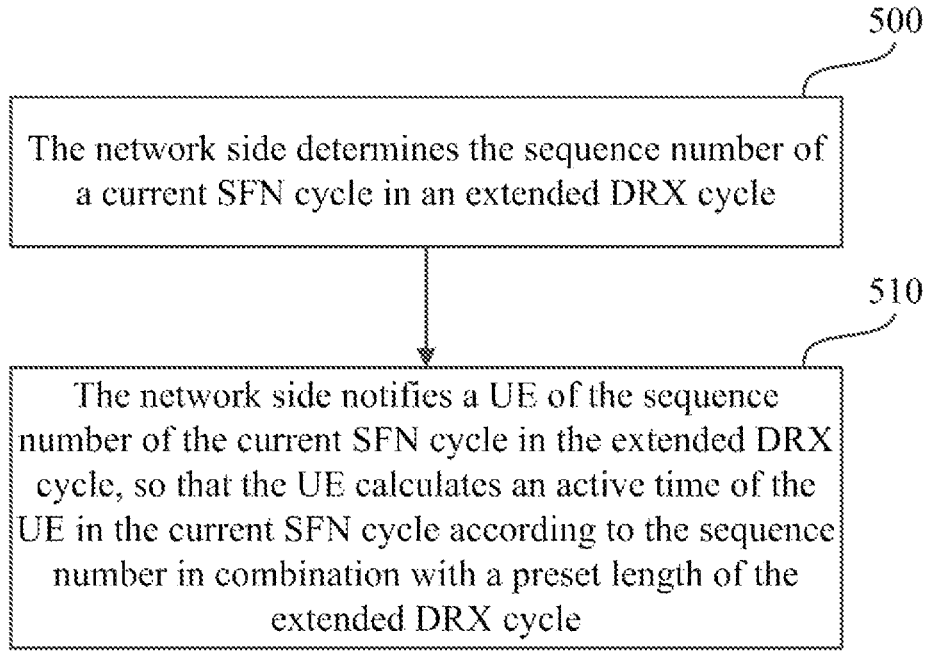
FIG. 5 illustrates a schematic flow chart of the network side notifying a UE of an active time according to an embodiment of the invention.

Referring to FIG. 5, there is illustrated a schematic flow chart of the network side notifying a UE of an active time according to an embodiment of the invention as follows:

Operation 500, the network side determines the sequence number of a current SFN cycle in an extended DRX cycle.

In the embodiment of the invention, the sequence number of the current SFN cycle in the extended DRX cycle is represented as an index ranging from 0 to n−1, where the longest extended DRX cycle is n times the SFN cycle.

Operation 510, the network side notifies a UE of the sequence number of the current SFN cycle in the extended DRX cycle, so that the UE calculates an active time of the UE in the current SFN cycle according to the sequence number in combination with a preset length of the extended DRX cycle.

In the embodiment of the invention, the network side (e.g., a base station) can notify the UE of the sequence number of the current SFN cycle in the extended DRX cycle, i.e., the index, in a system message and/or dedicated signaling.

For example, a system message is used by the network side.

For example, the network side can send the index of the current SFN cycle in the extended DRX cycle in a Master Information Block (MIB). Preferably the index of the current SFN cycle in the extended DRX cycle can be carried in remaining bits in an existing MIB, for example, if the longest extended DRX cycle is 8 times the SFN cycle, then 3 bits in the MIB can be used to indicate which SFN cycle among the 8 SFN cycles is the above index.

In another example, the network side sends the index of the current SFN cycle in the extended DRX cycle in an extended SIB. Preferably the index of the current SFN cycle in the extended DRX cycle can be sent in some Information Element (IE) extended in an existing SIB, for example, if the index is sent in the SIB 2, then the index will be carried in a new extended IE in the SIB 2.

In still another example, the network side can send the index of the current SFN cycle in the extended DRX cycle in a newly defined SIB. For example, the index can be sent in an SIB 20 which includes only the index of the current SFN cycle in the extended DRX cycle.

In whichever of the schemes above in which the index is sent, the index of the current SFN cycle in the extended DRX cycle, broadcasted by the network side shall be the same throughout the SFN cycle.

Particularly the SFN cycle is further divided into several system information modification periods, and the network side shall broadcast the same index of the current SFN cycle in the extended DRX cycle in each of the system information modification periods in the SFN cycle.

The UE will calculate its active time in a corresponding scheme, particularly as further introduced in the following embodiments, upon reception of the sequence number of the current SFN cycle in the extended DRX cycle, notified of by the network side.

Figure 6:
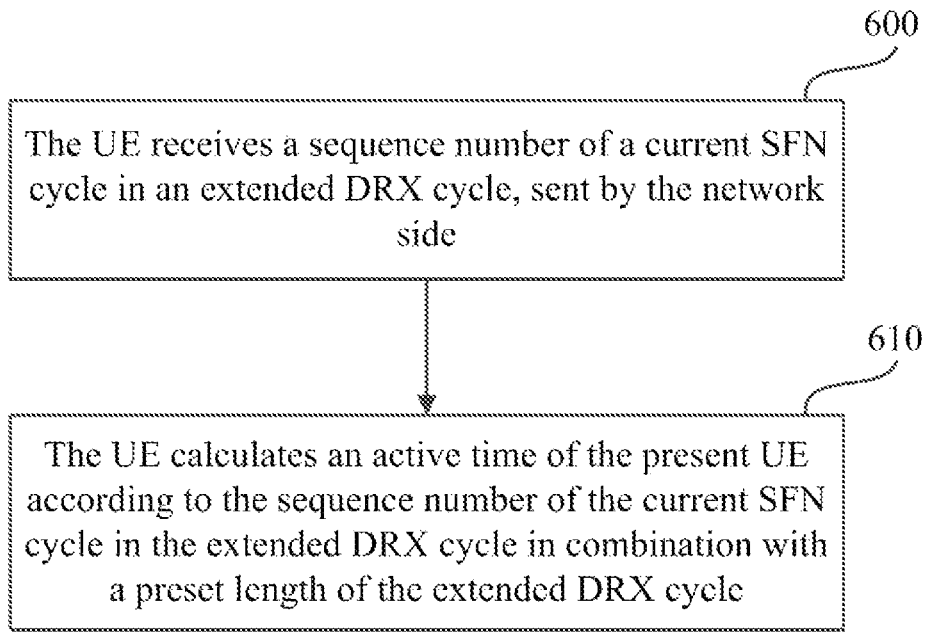
FIG. 6 illustrates a schematic flow chart of a UE calculating an active time according to a notification of the network side according to an embodiment of the invention.

In correspondence to the embodiment above, referring to FIG. 6, there is illustrated a general flow of a UE calculating its active time according to a notification of the network side according to an embodiment of the invention as follows:

Operation 600, the UE receives a sequence number of a current SFN cycle in an extended DRX cycle, sent by the network side.

In the embodiment of the invention, the sequence number of the current SFN cycle in the extended DRX cycle is represented as an index ranging from 0 to n−1, where the longest extended DRX cycle is n times the SFN cycle.

Operation 610, the UE calculates an active time of the present UE according to the sequence number of the current SFN cycle in the extended DRX cycle in combination with a preset length of the extended DRX cycle.

In the embodiment of the invention, the UE receives the sequence number of the current SFN cycle in the extended DRX cycle, i.e., the index, notified of by the network side in a system message and/or dedicated signaling.

For example, a system message is used for the UE.

For example, the UE can receive the index of the current SFN cycle in the extended DRX cycle, broadcasted by the network side in remaining bits in an MIB.

In another example, the UE can receive the index of the current SFN cycle in the extended DRX cycle, broadcasted by the network side in an extended IE in an existing SIB.

In still another example, the UE can receive the index of the current SFN cycle in the extended DRX cycle, broadcasted by the network side in a newly defined SIB.

Particularly the SFN cycle is further divided into several system information modification periods, and the UE shall receive the same index of the current SFN cycle in the extended DRX cycle, broadcasted by the network side in each of the system information modification periods in the SFN cycle.

Furthermore the UE calculates the active time of the present UE in the extended DRX cycle in a different scheme dependent upon its current state (i.e., the idle state or the connected state), as introduced below respectively, upon reception of the index of the current SFN cycle in the extended DRX cycle, notified of by the network side.

In a first scenario, the UE is in the idle state. At this time the active time of the UE refers to a time of the UE to start receiving paging by the network side (the network side can not determine an accurate position of the UE before paging), so the active time will also referred to as a paging time.

The UE obtains its active time (i.e., the paging time, or referred to as a radio frame in which a paging message is carried) by calculating as follows in combination of the preset length of the extended DRX cycle upon reception of the index of the current SFN cycle in the extended DRX cycle (also referred here to as a paging cycle), notified of by the network side.

Firstly the UE calculates locally the sequence number Y of an SFN cycle where the active time locates in the extended DRX cycle, and the sequence number Z of the active time in the SFN cycle, according to the preset length T of the extended DRX cycle in combination of a preset length S of the SFN cycle;

Next the UE determines that the current SFN cycle is the SFN cycle where the active time of the UE locates, and determines the active time of the present UE according to the sequence number Z of the active time in the SFN cycle, upon determining from the sequence number, which is the index, of the current SFN cycle in the extended DRX cycle, sent by the network side that a preset numerical relationship is satisfied between the index, and the locally calculated sequence number Y of the SFN cycle, where the active time locates, in the extended DRX cycle.

Details are as follows:

Firstly the UE calculate a radio frame X, where the active time locates, in the extended DRX cycle, according to the preset length T of the extended DRX cycle, a paging density, and identification information of the UE;

Secondly the UE calculates locally the sequence number Y of an SFN cycle, where the active time locates, in the extended DRX cycle, and the sequence number Z of the active time in the current SFN cycle, according to the preset length S of the SFN cycle in combination with the radio frame X, where the active time locates, in the extended DRX cycle;

Next the UE calculates such a multiple C that the extended DRX cycle is C times the current SFN cycle, according to the preset length T of the extended DRX cycle, and the length S of the SFN cycle; and Lastly the UE determines that the current SFN cycle is the SFN cycle where the active time locates of the UE, upon determining Y=Index mod C according to the index of the current SFN cycle in the extended DRX cycle, sent by the network side, and at this time the UE can start receiving a radio frame for paging, sent by the network side, at the active time indicated by Z.

For example, they can be calculated in the equations of:

$$X \bmod T = (T \operatorname{div} N)^*(UE\_ID \bmod N)$$

$$Y = X \operatorname{div} S$$

$$Z = X \bmod S$$

$$C = T \operatorname{div} S$$

Where X represents the radio frame where the active time locates in the extended DRX cycle, T represents the length of the extended DRX cycle, N represents the paging density, UE_ID represents the identifier of the UE, Y represents the sequence number, calculated locally by the UE, of the SFN cycle where the active time locates in the extended DRX cycle, Z represents the sequence number, calculated locally by the UE, of the radio frame where the active time locates in the SFN cycle, S represents the length of the SFN cycle (i.e., 10.24 s), and C represents a multiple of the extended DRX cycle relative to the SFN cycle.

If Y=index mode C, then the SFN cycle corresponding to the index indicated by the network side is the SFN cycle where the active time locates of the UE, and at this time the previously calculated and obtained Z is the active time corresponding to the UE.

In a second scenario, the UE is in the connected state. At this time the active time of the UE refers to a time of the UE to start receiving data of the network side (the network side has determined an accurate position of the UE before the data is sent), so the active time will also be referred to as an on Duration time.

The UE calculate its active time (i.e., the onDuration time, or also referred to as a radio frame and a sub-frame, in which reception of the data is started, also referred to as a DRX on Duration) as follows in combination with the preset length of the extended DRX cycle upon reception of the index of the current SFN cycle in the extended DRX cycle, notified of by the network side.

Firstly the UE determines the sequence number of a sub-frame where the active time locates according to a preset sub-frame offset;

Secondly the UE calculates the sequence number of a radio frame where the active time locates according to the index of the current SFN cycle in the extended DRX cycle, notified of by the network side, in combination with the calculated sequence number of the sub-frame where the active time locates, the preset sub-frame offset, and the length of the extended DRX cycle.

For example, if a long DRX cycle is applied, calculation can be performed in the equation of:

$$[(SFN^*10) + (K^*TSFN) + \text{subframe number}] \bmod (\text{longDRX-Cycle}) = \text{drxStartOffset}$$

Where the SFN represents the sequence number of the radio frame where the DRX on Duration locates; K represents the index of the SFN cycle where the DRX on Duration locates in the extended long DRX cycle; the TSFN represents a turn-around cycle of the SFN; the sub-frame number represents the sub-frame number of the DRX on Duration; the longDRX-cycle represents a preset length of the extended long DRX cycle; and the drxStartOffset represents the sub-frame offset of the DRX on Duration; and In another example, if a short DRX cycle is applied, then calculation can be performed in the equation of:

$$[(SFN^*10) + (K^*TSFN) + \text{subframe number}] \bmod (\text{shortDRX-Cycle}) = (\text{drxStartOffset}) \bmod (\text{shortDRX-Cycle})$$

Where, the SFN represents the sequence number of the radio frame where the DRX on Duration locates; K represents the index of the SFN cycle where the DRX on Duration locates in the extended long DRX cycle; the TSFN represents a turn-around cycle of the SFN; the sub-frame number represents the sub-frame number of the DRX on Duration; the shortDRX-cycle represents a preset length of the extended short DRX cycle; and the drxStartOffset represents the sub-frame offset of the DRX on Duration.

Of course if the network side notifies the UE of the index of the current SFN cycle in the extended DRX cycle in dedicated signaling, then the UE can determine that the current SFN cycle is the SFN cycle in which the DRX on Duration occurs, upon determining that the index of the current SFN cycle is the same as K.

The embodiments above will be described below in further details in several particular application scenarios.

A first application scenario relates to an example in which a paging time in an LTE system is calculated.

Figure 7:
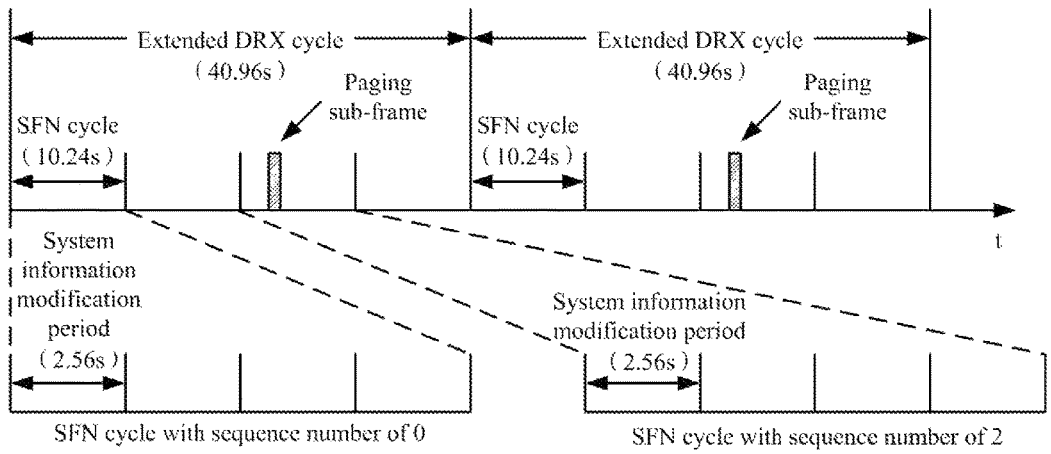
FIG. 7 to FIG. 9 illustrate schematic diagrams of a scenario where a UE calculates an active time according to embodiments of the invention.

In the LTE system, the currently set length of the SFN cycle is 10.24, and the longest extended DRX cycle (which is a paging cycle at this time) is 4 times the SFN cycle, i.e., 40.96 s, and the system information modification period is 2.56 s. A UE receives paging according to the extended DRX cycle of 40.96 s at an active time in a paging radio frame which is a radio frame with SFN=256 in an SFN cycle with the sequence number of 2 in the extended DRX cycle, particularly as illustrated in FIG. 7.

The network side broadcasts the sequence number, which is the index, of the current SFN cycle in the extended DRX cycle in a system message, in each system information modification period in each SFN cycle, where the network side shall ensure that the index broadcasted in the respective system messages be the same throughout the SFN cycle. The network side can broadcast the index in a newly defined IE in existing System Information (SI), or can broadcast the index in a new SIB (e.g., an SIB 20). In this embodiment, the network side broadcasts the index 2 of the SFN cycle, in the SFN cycle where the active time of the UE locates.

The UE can calculate the radio frame where the active time locates, upon reception of the index broadcasted by the network side, in the equations of (in radio frames):

$X \bmod T = (T \operatorname{div} N)*(UE\_ID \bmod N)$ $Y = X \operatorname{div} S$ $Z = X \bmod S$ $C = T \operatorname{div} S$ Where X represents the radio frame where the active time locates in the extended DRX cycle, T represents the length of the extended DRX cycle, N represents the paging density, UE_ID represents the identifier of the UE, Y represents the sequence number, calculated locally by the UE, of the SFN cycle where the active time locates in the extended DRX cycle, Z represents the sequence number, calculated locally by the UE, of the radio frame where the active time locates in the current SFN cycle, S represents the length of the SFN cycle (i.e., 10.24 s or 1024 radio frames), C represents a multiple of the extended DRX cycle relative to the SFN cycle, mod represents the remainder of the mod operation, and div represents rounding-down after the mod operation.

In this embodiment, T is 4096, N is 16, and UE_ID is 25.

The UE calculates X=2034, Y=2, Z=256, and C=4 in the equations above, and then the UE fetches the index of the current SFN cycle in the extended DRX cycle in the system message, and if Y=Index mode C, then the SFN cycle corresponding to the index is the SFN cycle including the radio frame where the active time of the UE locates. In this embodiment, Index=2 represents the SFN cycle including the radio frame where the active time locates, so the UE locates the radio frame with SFN=256 in the second SFN cycle, is awoken, and fetches a paging message of the network side.

Unlike the calculation scheme above, in another calculation scheme, the UE can calculate P=S*Index+M according to the SFN of the current radio frame (represented as M) after fetching the index of the current SFN cycle in the extended DRX cycle. The radio frame satisfying P mod T=X is the radio frame where the active time of the UE locates. In this embodiment, T=4096, X=2304, Index=2, and S=1024, and if P mod T=X, then M=256, and at this time the radio frame with SFN=256 is the paging radio frame including the active time of the UE.

A second application scenario relates to an example in which a paging time in a UMTS system is calculated.

Figure 8:
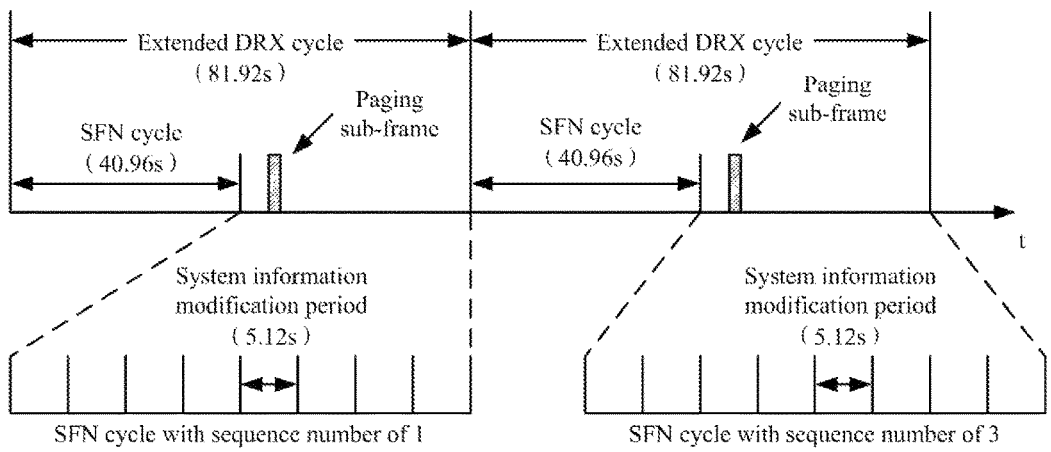

In the UMTS system, the currently preset SFN cycle is 40.96 s, the longest extended DRX cycle is 4 times the SFN cycle, i.e., 163.84 s, and the system information modification period is 5.12 s. An UE receives paging at the extended DRX cycle of 81.92 s at an active time in a paging radio frame which is a radio frame with SFN=256 in an SFN cycle with the sequence number of 1 in the extended DRX cycle, particularly as illustrated in FIG. 8.

The network side broadcasts the index of the current SFN cycle in the extended DRX cycle in a system message, in each system information modification period in each SFN cycle, where the network side shall ensure that the index broadcasted in the respective system messages be the same throughout the SFN cycle. The network side can broadcast the index in a newly defined IE in existing SI, or can broadcast the index in a new SIB (e.g., an SIB 20). In this embodiment, the network side broadcasts the indexes 1 and 3 of the SFN cycle, in the SFN cycle including the paging radio frame where the active time of the UE locates, that is the network side broadcasts the index twice, which is 1 in the first SFN cycle, and 3 in the third SFN cycle, both of which will be described together in the following embodiment for the sake of conciseness.

The UE can calculate the radio frame where the active time locates, upon reception of the index broadcasted by the network side, in the equations (in radio frames) of:

$X \bmod T = (T \operatorname{div} N)*(UE\_ID \bmod N)$ $Y = X \operatorname{div} S$ $Z = X \bmod S$ $C = T \operatorname{div} S$ Where X represents the radio frame including the active time in the extended DRX cycle, T represents the length of the extended DRX cycle, N represents the paging density, UE_ID represents the identifier of the UE, Y represents the sequence number, calculated locally by the UE, of the SFN cycle where the active time locates in the extended DRX cycle, Z represents the sequence number, calculated locally by the UE, of the radio frame where the active time locates in the current SFN cycle, S represents the length of the SFN cycle (i.e., 40.96 s), C represents a multiple of the extended DRX cycle relative to the SFN cycle, mod represents the remainder of the mod operation, and div represents rounding-down after the mod operation.

In this embodiment, T is 8192, N is 32, and UE_ID is 49.

The UE calculates X=4352, Y=1, Z=256, and C=2 in the equations above, and then the UE fetches the index of the SFN cycle in the system message, and if Y=Index mode C, then the SFN cycle corresponding to the index is the SFN cycle including the radio frame where the active time of the UE locates. In this embodiment, Index=1 and Index=3 represent the SFN cycles, both of which includes the radio frame where the active time locates, so the UE needs to locate the radio frame with SFN=256 in both the first and third SFN cycles, be awoken, and fetch a paging message of the network side.

A third application scenario relates to an example in which a DRX on Duration in an LTE system is calculated.

Figure 9:
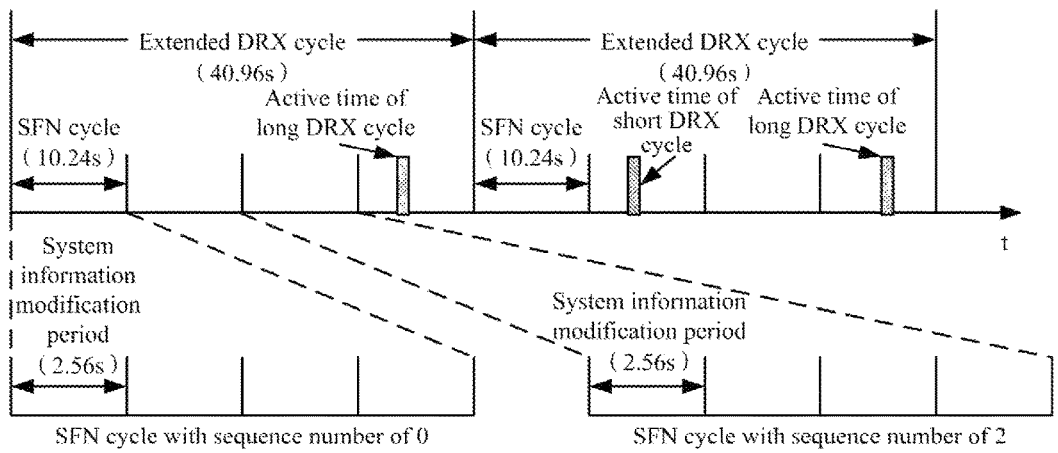

In the LTE system, the currently set length of the SFN cycle is 10.24, and the longest extended DRX cycle is 4 times the SFN cycle, i.e., 40.96 s, and the system information modification period is 2.56 s, particularly as illustrated in FIG. 9.

The network side broadcasts the index of the current SFN cycle in the extended DRX cycle in a system message, in each system information modification period in each SFN cycle, where the network side shall ensure that the index broadcasted in the respective system messages be the same throughout the SFN cycle. The network side can broadcast the index in a newly defined IE in existing SI, or can broadcast the index in a new SIB (e.g., an SIB 20).

In this embodiment, the network side broadcasts the indexes 1 and 3 of the SFN cycle, in the SFN cycle including the radio frame where the DRX on Duration of the UE locates, that is the network side broadcasts the index twice, which is 1 in the first SFN cycle, and 3 in the third SFN cycle, both of which will be described together in the following embodiment for the sake of conciseness.

If the UE receives in dedicated signaling the longDRX-Cycle (i.e., the extended long DRX cycle) which is 4 times the SFN cycle (10240*4=40960), the sub-frame offset of DRX which is (10240*3+103=30823) ms, and the index K=3 of the SFN cycle in the extended DRX cycle, then the UE calculates the position of the DRX on Duration in the long DRX cycle in the equation of:

$[(SFN*10)+(K*TSFN)+\text{subframe number}] \bmod (\text{longDRX-Cycle}) = \text{drxStartOffset}$ Where the SFN represents the sequence number of the radio frame where the DRX on Duration locates; K represents the index of the SFN cycle including the DRX on Duration in the extended long DRX cycle; the TSFN represents a turn-around cycle of the SFN, which is 10240 in the LTE system; the sub-frame number represents the sub-frame number of the DRX on Duration; the longDRX-cycle represents a preset length of the extended long DRX cycle; and the drxStartOffset represents the sub-frame offset of the DRX on Duration.

The UE calculate the position of the DRX on Duration in the long DRX cycle as:

[(10*10)+(3*10240)+3]modulo(40960)=30823

Subframe number=3

K=3

SFN=10

If the UE receives in dedicated signaling the shortDRX-Cycle (i.e., the extended short DRX cycle) which is 4 times the SFN cycle (10240*2=20480), that is, K is 2, then the UE calculates the position of the DRX on Duration in the short DRX cycle in the equation of:

[(SFN*10)+(K*TSFN)+subframe number]modulo
    (shortDRX-Cycle)=(drxStartOffset)modulo
    (shortDRX-Cycle)

The UE calculate the position of the DRX on Duration in the short DRX cycle as:

[(10*10)+(1*10240)+3]modulo(20480)=(10240*3+
    103=30823)modulo (10240*2)=10343

Where the SFN represents the sequence number of the radio frame where the DRX on Duration locates; K represents the index of the SFN cycle where the DRX on Duration locates in the extended short DRX cycle; the TSFN represents a turn-around cycle of the SFN, which is 10240 in the LTE system; the sub-frame number represents the sub-frame number of the DRX on Duration; the longDRX-cycle represents a preset length of the extended long DRX cycle; and the drxStartOffset represents the sub-frame offset of the DRX on Duration.

The UE calculate the position of the DRX on Duration in the short DRX cycle as:

Subframe number=3

K=3

SFN=10

Apparently the UE can be awoken in the third sub-frame in the radio frame with SFN=10 in the current SFN cycle to receive service data transmitted by the network side.

On the other hand, in the third application scenario, the UE can alternatively calculate the position of the DRX on Duration in the extended long DRX cycle, and the position of the DRX on Duration in the extended short DRX cycle in the following equations.

I. The position of the DRX on Duration in the extended long DRX cycle is calculated.

Firstly the UE calculates the position of the extended long DRX cycle in the SFN cycle in the equations of:

Toffset=drxStartOffset div TSFN

Tlong=longDRX-Cycle div TSFN

K modulo Tlong=Toffset

Where the TSFN represents a turn-around cycle of the SFN, which is 10240 in the LTE system; and K represents the index of the SFN cycle where the DRX on Duration locates.

Secondly the UE calculates the SFN and the sub-frame number in the SFN cycle K in the equation of:

(SFN*10)+subframe number=drxStartOffset modulo
    TSFN

Where the SFN represents the sequence number of the radio frame where the DRX on Duration locates; and the sub-frame number represents the sub-frame number of the DRX on Duration.

Lastly the UE can calculate the radio frame including the DRX on Duration in the extended long DRX cycle in the equations of:

Toffset=30823 div 10240=3

Tlong=40960 div 10240=4

3 modulo 4=3

K=3                                                                1)

(10*10)+3=(30823 modulo 10240)

SFN=10

Subframe number=3                                                  2)

II. If the UE receives the extended short DRX cycle which is twice the SFN cycle (10240*2=20480), then the UE can calculate the position of the DRX on Duration in the extended short DRX cycle in the following equations.

Firstly the UE calculates the position of the extended short DRX cycle in the SFN cycle in the equations of:

Toffset_short=[(drxStartOffset)modulo(shortDRX-
    Cycle)]div TSFN

Tshort=shortDRX-Cycle div TSFN

K modulo Tshort=Toffset_short

Where the TSFN represents a turn-around cycle of the SFN, which is 10240 in the LTE system; and K represents the index of the SFN cycle where the DRX on Duration locates.

Secondly the UE calculates the SFN and the sub-frame number in the SFN cycle K in the equation of:

(SFN*10)+subframe number=[(drxStartOffset)
    modulo(shortDRX-Cycle)]modulo TSFN Where the SFN represents the sequence number of the radio frame including the DRX on Duration; and the sub-frame number represents the sub-frame number of the DRX on Duration.

Lastly the UE can calculate the radio frame including the DRX on Duration in the extended short DRX cycle in the equations of:

Toffset_short=[(30823)modulo(20480)]div 10240=1

Tshort=20480 div 10240=2

1 modulo 2=1

K=1                                                                1)

$$(10*10)+3=[(30823) \bmod (20480)] \bmod$$
$$10240=103$$

SFN=10 subframe number=3    (2)

As can be apparent from the respective embodiments above, the UE in either idle state or the connected state can calculate the sequence number of the radio frame including the active time as long as the UE obtains the index of the current SFN cycle in the extended DRX cycle, notified of by the network side, and the preset length of the extended DRX cycle (which can be locally configured or negotiated with the network side), so that the UE can be awoken at the accurate time to receive paging or service data.

Figure 10:
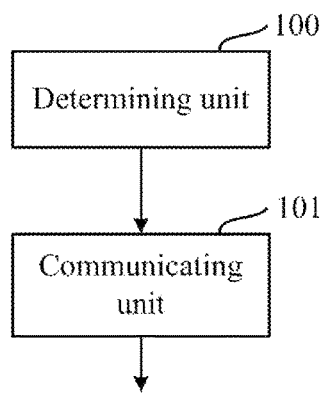
FIG. 10 illustrates a schematic functional-structural diagram of a network-side device according to an embodiment of the invention.

Further to the respective embodiments above, referring to FIG. 10, a network-side device according to an embodiment of the invention includes a determining unit 100 and a communicating unit 101, where:

The determining unit 100 is configured to determine the sequence number of a current SFN cycle in an extended DRX cycle; and The communicating unit 101 is configured to notify a UE of the sequence number of the current SFN cycle in the extended DRX cycle, so that the UE calculates an active time of the UE in the current SFN cycle according to the sequence number in combination with a preset length of the extended DRX cycle.

The communicating unit 101 notifies the UE of the sequence number of the current SFN cycle in the extended DRX cycle in each system information modification period in the current SFN cycle.

The communicating unit 101 broadcasts the sequence number of the current SFN cycle in the extended DRX cycle to the UE in a system message; and/or sends the sequence number of the current SFN cycle in the extended DRX cycle to the UE in dedicated signaling.

The communicating unit 101 carries the sequence number of the current SFN cycle in the extended DRX cycle in remaining bits in an MIB; or carries the sequence number of the current SFN cycle in the extended DRX cycle in a corresponding extended Information Element (IE) in an SIB; or carries the sequence number of the current SFN cycle in the extended DRX cycle in a newly defined SIB.

Figure 11:
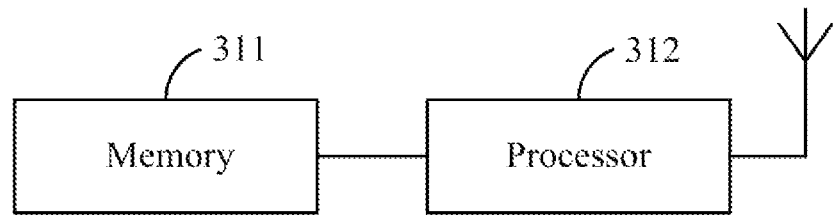
FIG. 11 illustrates a schematic functional-structural diagram of another network-side device according to an embodiment of the invention.

Referring to FIG. 11, another network-side device according to an embodiment of the invention includes a memory 311 and a processor 312, where:

The processor 312 is configured with a computer program, etc., to perform the method at the network side according to the embodiment above of the invention to thereby perform the functions of the network-side device according to the embodiment of the invention; the memory 311 is configured to store codes of the computer program to configure a processor 312; and the processor 312 can include a baseband processing component, a radio frequency processing component, and other components, as needed, to transmit related information. Particularly:

The processor 312 determines the sequence number of a current SFN cycle in an extended DRX cycle; and The processor 312 notifies a UE of the sequence number of the current SFN cycle in the extended DRX cycle, so that the UE calculates an active time of the UE according to the sequence number in combination with a preset length of the extended DRX cycle.

The processor 312 notifies the UE of the sequence number of the current SFN cycle in the extended DRX cycle in each system information modification period in the current SFN cycle.

The processor 312 broadcasts the sequence number of the current SFN cycle in the extended DRX cycle to the UE in a system message; and/or sends the sequence number of the current SFN cycle in the extended DRX cycle to the UE in dedicated signaling.

The processor 312 carries the sequence number of the current SFN cycle in the extended DRX cycle in remaining bits in an MIB; or carries the sequence number of the current SFN cycle in the extended DRX cycle in a corresponding extended Information Element (IE) in an SIB; or carries the sequence number of the current SFN cycle in the extended DRX cycle in a newly defined SIB.

Figure 12:
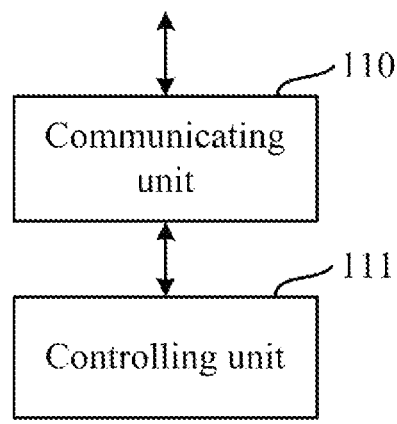
FIG. 12 illustrates a schematic functional-structural diagram of a UE according to an embodiment of the invention.

Referring to FIG. 12, a UE-side device according to an embodiment of the invention includes a communicating unit 110 and a controlling unit 111, where:

The communicating unit 110 is configured to receive the sequence number of a current SFN cycle in an extended DRX cycle, sent by the network side; and The controlling unit 111 is configured to calculate an active time of the present device according to the sequence number of the current SFN cycle in the extended DRX cycle in combination with a preset length of the extended DRX cycle.

The communicating unit 110 receives the sequence number of the current SFN cycle in the extended DRX cycle, notified of by the network side in each system information modification period in the current SFN cycle.

The communicating unit 110 receives the sequence number of the current SFN cycle in the extended DRX cycle, broadcasted by the network side in a system message; and/or receives the sequence number of the current SFN cycle in the extended DRX cycle, sent by the network side in dedicated signaling.

The communicating unit 110 receives the sequence number of the current SFN cycle in the extended DRX cycle, broadcasted by the network side in remaining bits in a Master Information Block (MIB); or receives the sequence number of the current SFN cycle in the extended DRX cycle, broadcasted by the network side in an extended Information Element (IE) in a System Information Block (SIB); or receives the sequence number of the current SFN cycle in the extended DRX cycle, broadcasted by the network side in a newly defined SIB.

If the present device is in the idle state, then the controlling unit 110 calculates locally the sequence number Y of an SFN cycle where the active time locates in the extended DRX cycle, and the sequence number Z of the active time in the SFN cycle, according to the preset length T of the extended DRX cycle in combination of a preset length S of the SFN cycle; and determines that the current SFN cycle is the SFN cycle where the active time of the UE locates, and determines the active time of the present UE according to the sequence number Z of the active time in the SFN cycle, upon determining from the sequence number of the current SFN cycle in the extended DRX cycle, sent by the network side that a preset numerical relationship is satisfied between the sequence number, and the locally calculated sequence number Y of the SFN cycle where the active time locates in the extended DRX cycle.

If the present device is in the connected state, then the controlling unit 110 determines the sequence number of a sub-frame including the active time according to a preset sub-frame offset; and calculates the sequence number of a radio frame including the active time according to the sequence number of the current SFN cycle in the extended DRX cycle, notified of by the network side, in combination with the calculated sequence number of the sub-frame including the active time, the preset sub-frame offset, and the length of the extended DRX cycle.

Figure 13:
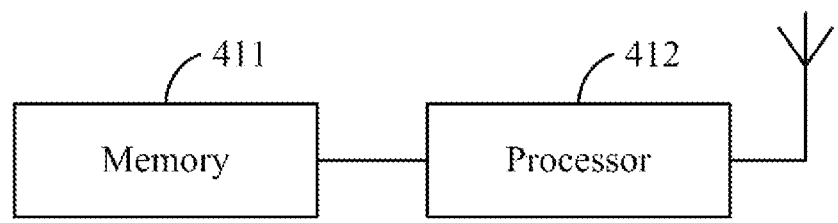
FIG. 13 illustrates a schematic functional-structural diagram of another UE according to an embodiment of the invention.

Referring to FIG. 13, another UE-side device according to an embodiment of the invention includes a memory 411 and a processor 412, where:

The processor 412 is configured with a computer program, etc., to perform the method at the UE side according to the embodiment above of the invention to thereby perform the functions of the UE-side device according to the embodiment of the invention; the memory 411 is configured to store codes of the computer program to configure a processor 412; and the processor 412 can include a baseband processing component, a radio frequency processing component, and other components, as needed, to transmit related information. Particularly:

The processor 412 is configured to receive the sequence number of a current SFN cycle in an extended DRX cycle, sent by the network side; and The processor 412 is configured to calculate an active time of the present device according to the sequence number of the current SFN cycle in the extended DRX cycle in combination with a preset length of the extended DRX cycle.

The processor 412 receives the sequence number of the current SFN cycle in the extended DRX cycle, notified of by the network side in each system information modification period in the current SFN cycle.

The processor 412 receives the sequence number of the current SFN cycle in the extended DRX cycle, broadcasted by the network side in a system message; and/or receives the sequence number of the current SFN cycle in the extended DRX cycle, sent by the network side in dedicated signaling.

The processor 412 receives the sequence number of the current SFN cycle in the extended DRX cycle, broadcasted by the network side in remaining bits in a Master Information Block (MIB); or receives the sequence number of the current SFN cycle in the extended DRX cycle, broadcasted by the network side in an extended Information Element (IE) in a System Information Block (SIB); or receives the sequence number of the current SFN cycle in the extended DRX cycle, broadcasted by the network side in a newly defined SIB.

If the present device is in the idle state, then the processor 412 calculates locally the sequence number Y of an SFN cycle where the active time locates in the extended DRX cycle, and the sequence number Z of the active time in the SFN cycle, according to the preset length T of the extended DRX cycle in combination of a preset length S of the SFN cycle; and determines that the current SFN cycle is the SFN cycle including the active time of the UE, and determines the active time of the present UE according to the sequence number Z of the active time in the SFN cycle, upon determining from the sequence number of the current SFN cycle in the extended DRX cycle, sent by the network side that a preset numerical relationship is satisfied between the sequence number, and the locally calculated sequence number Y of the SFN cycle including the active time in the extended DRX cycle.

If the present device is in the connected state, then the processor 412 determines the sequence number of a sub-frame including the active time according to a preset sub-frame offset; and calculates the sequence number of a radio frame including the active time according to the sequence number of the current SFN cycle in the extended DRX cycle, notified of by the network side, in combination with the calculated sequence number of the sub-frame including the active time, the preset sub-frame offset, and the length of the extended DRX cycle.

In summary, in the embodiments of the invention, the network side notifies the UE of the sequence number of the current SFN cycle in the extended DRX cycle, and the UE calculates an active time of the present UE according to the sequence number in combination with the preset length of the extended DRX cycle, so that even if the extended DRX cycle is longer than the SFN cycle, the UE can calculate a correct paging time and/or a correct time to receive service data, to thereby avoid effectively the UE from losing a paging message or service data due to an error in calculation, so that the UE can be activated at the accurate time, thus guaranteeing the Quality of Service (QoS) of the UE and improving the service performance of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for calculating an active time, the method comprising:
   receiving, by a User Equipment, UE, a sequence number of a current System Frame Number, SFN, cycle in an extended Discontinuous Reception, DRX, cycle, sent by a network side device, in each of system information modification periods in the current SFN cycle, wherein the current SFN cycle is divided into several system information modification periods, and the sequence numbers of the current SFN cycle in the extended DRX cycle, sent by the network side device in respective system information modification periods in the current SFN cycle are same; and
   calculating, by the UE, an active time of the UE according to the sequence number of the current SFN cycle in the extended DRX cycle in combination with a preset length of the extended DRX cycle;
   wherein if the UE is in an idle state, then calculating, by the UE, the active time of the UE according to the sequence number of the current SFN cycle in the extended DRX cycle in combination with the preset length of the extended DRX cycle comprises:
   calculating, by the UE, locally a sequence number Y of an SFN cycle comprising the active time in the extended DRX cycle, and a sequence number Z of the active time in the SFN cycle, according to the preset length T of the extended DRX cycle in combination of a preset length S of the SFN cycle; and
   determining, by the UE, that the current SFN cycle is the SFN cycle comprising the active time of the UE, and determining the active time of the present UE according to the sequence number Z of the active time in the SFN cycle, upon determining from the sequence number of the current SFN cycle in the extended DRX cycle, sent by the network side device that a preset numerical relationship is satisfied between the sequence number, and the locally calculated sequence number Y of the SFN cycle comprising the active time in the extended DRX cycle;
   or, wherein if the UE is in a connected state, then calculating, by the UE, the active time of the UE according to the sequence number of the current SFN cycle in the extended DRX cycle in combination with the preset length of the extended DRX cycle comprises:
   determining, by the UE, a sequence number of a sub-frame including the active time according to a preset sub-frame offset; and
   calculating, by the UE, a sequence number of a radio frame including the active time according to the sequence number of the current SFN cycle in the extended DRX cycle, notified of by the network side device, in combination with the calculated sequence number of the sub-frame comprising the active time, the preset sub-frame offset, and the length of the extended DRX cycle.

2. The method according to claim 1, wherein receiving, by the UE, the sequence number of the current SFN cycle in the extended DRX cycle, notified of by the network side device comprises:
   receiving, by the UE, the sequence number of the current SFN cycle in the extended DRX cycle, broadcasted by the network side device in a system message; and/or
   receiving, by the UE, the sequence number of the current SFN cycle in the extended DRX cycle, sent by the network side device in dedicated signaling.

3. The method according to claim 2, wherein if the UE receives the sequence number of the current SFN cycle in the extended DRX cycle, broadcasted by the network side device in the system message, the receiving, by the UE, the sequence number of the current SFN cycle in the extended DRX cycle, broadcasted by the network side device in the system message comprises:
   receiving, by the UE, the sequence number of the current SFN cycle in the extended DRX cycle, broadcasted by the network side device in remaining bits in a Master Information Block, MIB, in the system message; or
   receiving, by the UE, the sequence number of the current SFN cycle in the extended DRX cycle, broadcasted by the network side device in an extended Information Element, IE, in a System Information Block, SIB, in the system message; or
   receiving, by the UE, the sequence number of the current SFN cycle in the extended DRX cycle, broadcasted by the network side device in a newly defined SIB in the system message.

4. A device for calculating an active time, the device comprising:
   at least one processor; and
   a memory communicably connected with the at least one processor for storing instructions executable by the at least one processor, wherein execution of the instructions by the at least one processor causes the at least one processor to perform:
   receiving a sequence number of a current System Frame Number, SFN, cycle in an extended Discontinuous Reception, DRX, cycle, sent by a network side device, in each of system information modification periods in the current SFN cycle, wherein the current SFN cycle is divided into several system information modification periods, and the sequence numbers of the current SFN cycle in the extended DRX cycle, sent by the network side device in respective system information modification periods in the current SFN cycle are same; and
   calculating an active time of the present device according to the sequence number of the current SFN cycle in the extended DRX cycle in combination with a preset length of the extended DRX cycle;
   wherein if the present device is in an idle state, then calculating the active time of the present UE according to the sequence number of the current SFN cycle in the extended DRX cycle in combination with the preset length of the extended DRX cycle comprises:
   calculating locally a sequence number Y of an SFN cycle comprising the active time in the extended DRX cycle, and a sequence number Z of the active time in the SFN cycle, according to the preset length T of the extended DRX cycle in combination of a preset length S of the SFN cycle; and
   determining that the current SFN cycle is the SFN cycle comprising the active time of the UE, and determining the active time of the present UE according to the sequence number Z of the active time in the SFN cycle, upon determining from the sequence number of the current SFN cycle in the extended DRX cycle, sent by the network side device that a preset numerical relationship is satisfied between the sequence number, and the locally calculated sequence number Y of the SFN cycle comprising the active time in the extended DRX cycle;

or, wherein if the present device is in a connected state, then calculating the active time of the present UE according to the sequence number of the current SFN cycle in the extended DRX cycle in combination with the preset length of the extended DRX cycle comprises:

determining a sequence number of a sub-frame comprising the active time according to a preset sub-frame offset; and calculating a sequence number of a radio frame comprising the active time according to the sequence number of the current SFN cycle in the extended DRX cycle, notified of by the network side device, in combination with the calculated sequence number of the sub-frame comprising the active time, the preset sub-frame offset, and the length of the extended DRX cycle.

5. The device according to claim 4, wherein receiving the sequence number of the current SFN cycle in the extended DRX cycle, notified of by the network side device comprises:

receiving the sequence number of the current SFN cycle in the extended DRX cycle, broadcasted by the network side device in a system message; and/or receiving the sequence number of the current SFN cycle in the extended DRX cycle, sent by the network side device in dedicated signaling.

6. The device according to claim 5, wherein if the sequence number of the current SFN cycle in the extended DRX cycle, broadcasted by the network side device is received in the system message, the receiving the sequence number of the current SFN cycle in the extended DRX cycle, broadcasted by the network side device in the system message comprises:

receiving the sequence number of the current SFN cycle in the extended DRX cycle, broadcasted by the network side device in remaining bits in a Master Information Block, MIB, in the system message; or receiving the sequence number of the current SFN cycle in the extended DRX cycle, broadcasted by the network side device in an extended Information Element, IE, in a System Information Block, SIB, in the system message; or receiving the sequence number of the current SFN cycle in the extended DRX cycle, broadcasted by the network side device in a newly defined SIB in the system message.

\* \* \* \* \*